United States Patent [19]

Esson

[11] Patent Number: 5,158,227
[45] Date of Patent: Oct. 27, 1992

[54] PROCESS OF MAKING SEAMLESS METAL TUBE

[75] Inventor: Donald G. Esson, St. Sault Marie, Canada

[73] Assignee: Arc Tube Inc., Sault Ste. Marie, Canada

[21] Appl. No.: 886,242

[22] Filed: May 21, 1992

[51] Int. Cl.⁵ .................... B23K 13/01; B23K 13/02
[52] U.S. Cl. .................................. 228/147; 228/155;
        228/232; 228/17.5; 164/465; 219/8.5; 219/61.2
[58] Field of Search ............... 228/146, 155, 222, 232,
        228/17.5; 164/464, 465, 471, 477, 488, 122.1;
        219/8.5, 61.1, 61.11, 61.2; 264/214

[56] References Cited
    U.S. PATENT DOCUMENTS

| | | |
|---|---|---|
| 2,788,426 | 4/1957 | Thompson . |
| 2,792,482 | 5/1957 | Logan et al. . |
| 3,164,896 | 1/1965 | Fullman ............................. 164/465 |
| 3,248,512 | 4/1966 | Sommer . |
| 3,610,320 | 10/1971 | Izn ..................................... 164/465 |
| 3,728,782 | 4/1973 | Ziemek ............................. 228/147 |
| 4,129,846 | 12/1978 | Yablochnikov . |
| 4,560,849 | 12/1985 | Migliori et al. . |

FOREIGN PATENT DOCUMENTS 3034792 4/1982 Fed. Rep. of Germany .
190752 11/1982 Japan ................................ 164/465

Primary Examiner—Samuel M. Heinrich
Attorney, Agent, or Firm—Stanley E. Johnson

[57] ABSTRACT

A process for the continuous manufacture of seamless tube by confining a selected length of metal strip in the form of a tube and with at least two longitudinal abutting edges and completely melting a selected length of such tubular form to form a seamless tube and cooling the formed seamless tube. The cooling is preferably in a controlled atmosphere of nitrogen and the temperature is reduced to about 700° F. before further processing takes place. In a preferred process the material is a single strip of metal formed into a tube with only one longitudinal seam and it is moved continuously through a mould heated by induction heating selectively controlled to cause the tube to preheat to a selected temperature and then be subjected to a temperature bringing the metal to its molten state to form a seamless tube and while the seamless tube is moving it is cooled downstream from the melting zone solidifying the metal and bringing it to a selected temperature before exiting the mould.

8 Claims, 1 Drawing Sheet

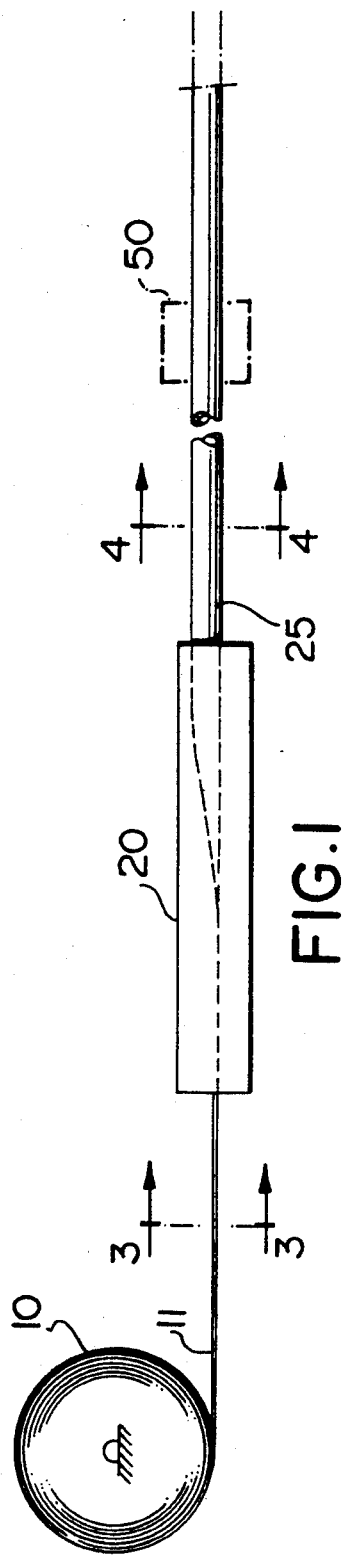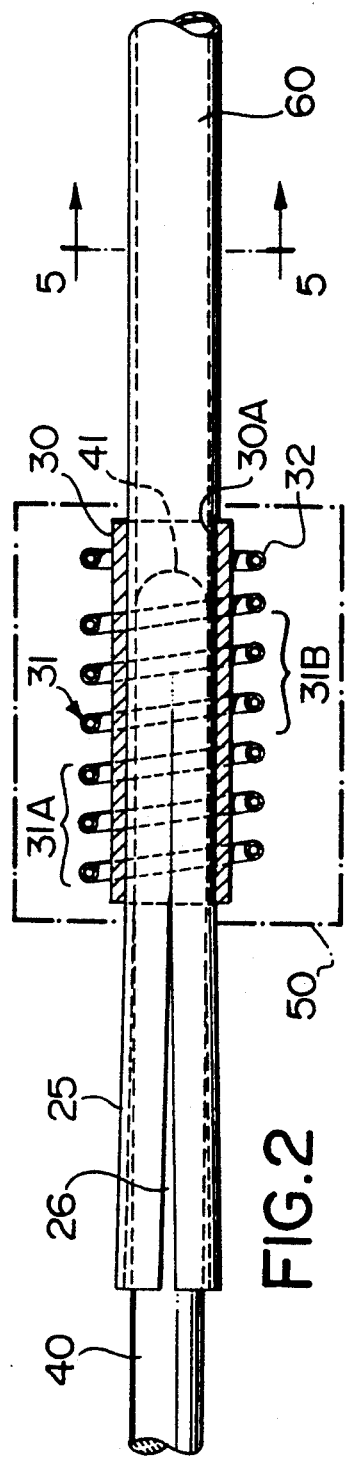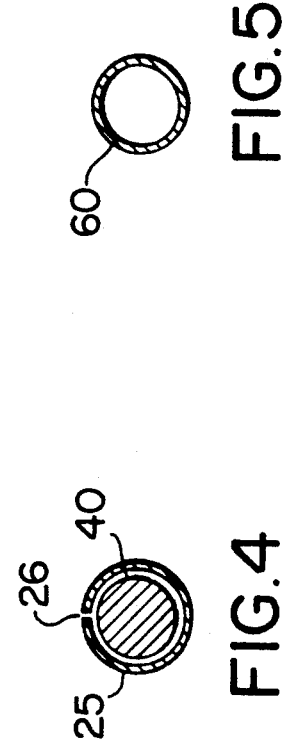

PROCESS OF MAKING SEAMLESS METAL TUBE

FIELD OF INVENTION

This invention relates to a process of making seamless tube from flat strip stock and preferably to the process of making seamless steel tubing.

BACKGROUND OF INVENTION

Seamless metal tubing also known as seamless mechanical tubing has outside diameters ranging from ⅛ inch to 10¾ inches and wall thicknesses ranging from 20 gauge to 2 inches. The tubing may be oval, square, rectangular or other special shape in cross-section obtainable in various sizes and wall thicknesses. Mechanical tubing is available either hot finished or cold drawn but furnished (principally) cold drawn and is adaptable to varied treatment by expansion, cupping, tapering, swaging, flanging, coiling, welding and similar manipulations. Seamless metal tubing has a number of uses as aircraft tubing and automobile components. Small diameter seamless steel tubing is used by way of example on automotive brake lines.

Seamless carbon-steel tubing is expensive to produce and is made in finite lengths principally by heating a round metal ingot, punching a hole in the ingot and working the so punched ingot into a tube of selected length, diameter and wall thickness.

A method of making continuous seamless tubing is disclosed in DE 3034792 dated Sept. 16, 1980. The continuous manufacturing is in a single production line that includes melting, casting, machining, drawing and shearing stations. In this process a bath of molten metal is required from which it can be drawn in the form of a continuous seamless tubing. Considerable heat is required to maintain a molten bath and from which there is substantial heat losses.

Another means of forming a tube is by seam welding as disclosed in U.S. Pat. No. 3,248,512 issued Apr. 26, 1966 to R. A. Sommer. This patent discloses the use of induction heating with selective concentration of the heating to melt the material of abutting edges downwardly from the point of convergence and wherein there is pressural contact of such abutting edges. The end product is a welded seam tube.

SUMMARY OF INVENTION

An object of the present invention is to provide a process for the continuous manufacture of seamless tube by confining a selected length of metal strip in the form of a tube and with at least two longitudinal abutting edges and completely melting a selected length of such tubular form to form a seamless tube and cooling the formed seamless tube. The cooling is preferably in a controlled atmosphere of nitrogen and the temperature is reduced to about 700° F. before further processing takes place.

In accordance with the present invention there is provided a process for forming seamless metal tubing comprising confining a selected length of strip material having tubular form, with at least one longitudinal seam, between an open ended outer sleeve and an inner mandrel which together define a forming mould; heating a portion of said selected length to a selected temperature; further heating part of said portion to the melting temperature of the material to form a tube of molten material; causing relative axial movement of said forming mould and said tub to allow the molten material to solidify into a seamless tube while a continuing adjacent length of the tube is brought to its molten state and continuing the process until a seamless continuous length of tube of selected length is formed.

In a preferred process the material is a single strip of metal formed into a tube with only one longitudinal seam and is moved continuously through a mould heated by induction heating selectively controlled to cause the tube to preheat to a selected temperature and then be subjected to a temperature bringing the metal to its molten state to form a seamless tube and while the seamless tube is moving it is cooled downstream from the melting zone solidifying the metal and bringing it to a selected temperature before exiting from the mould.

LIST OF DRAWINGS

The invention is illustrated by way of example in the accompanying drawings wherein:

FIG. 1 is a side elevational view of a portion of the process forming a strip of material into a tube;

FIG. 2 is a continuation of that process wherein the formed tube passes through a forming mould in which a portion of the tube is heated to its molten state to form a seamless tube;

FIG. 3 is a sectional view taken along essentially line 3—3 of FIG. 1;

FIG. 4 is a sectional view taken essentially along line 4—4 of FIG. 1; and

FIG. 5 is a view taken essentially along line 5—5 of FIG. 2.

DESCRIPTION OF PREFERRED EMBODIMENT

FIGS. 1 and 2 diagrammatically illustrate the process of the present invention of forming a strip of metallic material, for example, 1010 steel into a tube and passing such formed tube to a selectively controlled heating zone and forming mould to bring the seamed tube to a molten state and while in the mould as it moves continuously solidifying to form and exit as a seamless tube.

FIG. 1 diagrammatically illustrates a coil 10 of strip metal which, for example, could be a 1,000 pound coil of cold roll No. 1010 steel having a width W of 1.6 inches and a thickness T of 0.028 inches. The strip is propelled by a roll former 20 producing a tube 25 having a longitudinal seam 26.

FIG. 2 is a continuation of FIG. 1 downstream therefrom illustrating a ceramic rod 40 that extends from the former 20 and mounted in any convenient manner (not shown) so as to be located interiorly of the tube. The roll former 20 pushes the formed tube 25 through a ceramic sleeve 30 disposed concentrically with and about the ceramic rod 40. The terminal end of the ceramic rod 40 is shown in broken line and identified by the reference 41. The thickness of the formed tubing corresponds to the space between the outer surface of the ceramic rod 40 and the inner surface 30A of the ceramic sleeve 30.

While the formed tube is being propelled through the forming mould, which consists of the rod 40 and the sleeve 30, the portion of the formed tube within the sleeve is heated by electric induction. Heating is controlled along a selected length of the tube within the forming mould so that as the tube progresses there is initially preheating taking the formed tube with the metal seam to a peak temperature of about 1600° F. Following this preheat station the heat by the induction coil is concentrated to increase the temperature so as to melt the tube. This concentration of heat can be by the addition of windings or other means known in the art and by way of example reference may be had to the teachings of the aforementioned U.S. Pat. No. 3,248,512 or the teachings of U.S. Pat. Nos. 2,788,426 issued Apr. 9, 1957 to G. K. Thompson; 2,792,482 issued May 14, 1957 to J. A. Logan et al; 4,129,846 issued Dec. 12, 1978 to Boris A. Yablochnikov and 4,560,849 issued Dec. 24, 1985 to Albert Migliori et al. The induction heating coil in FIG. 2 is identified by the reference numeral 31 having an initial preheat portion 31A followed by a concentrated heat portion 31B. Downstream from this is a cooling coil 32 so that after the entire tube has been melted it is then cooled to a selected temperature before exiting from the forming mould as a formed seamless tube 60.

The heating and cooling of the tube in the forming mould is preferably in a controlled atmosphere, for example, as provided by an enclosure designated 50 shown in broken line and in which there is a controlled atmosphere of nitrogen.

The drawing of the strip from the roll and forming it into a tube by the former 20 is pushed by such roll former 20 in a continuous manner through the preheat, melt and cooling stations. In the preheat station the temperature is taken to the peak metal temperature of about 1600° F. Heat is concentrated by the induction coil by way of the section 31B thereof melting the tube and this melted tube is encapsulated on its outside diameter in the ceramic tube and on its inside diameter over the ceramic rod 40. The melting of the metal strip along the section 31B of the induction heating coil forms a seamless tube that is cooled down to about 700° F. before being further processed into smaller diameter tubing.

The preheat, melt and cooling takes place in a nitrogen controlled atmosphere and this prevents scaling of the formed tubing. The tube after being formed can be further worked for example by cold working to bring it to its desired diameter and thickness.

While in the foregoing there is disclosed a single strip of material from which the tube is formed several strips could be used that are parallel to one another and formed into a tube providing more than one longitudinal seam. The strips of metal are melted along a selected portion of the length within the forming mould. The melt forms into a seamless tube and as the tube progresses in its selected path of travel there is continuous melting that progressively moves along the length of the tube while downstream from the melt there is cooling that solidifies the melt forming a rigid seamless tube.

The foregoing discloses a continuous process where the tube moves relative to the induction heater and mould. The same principle could be used on a selected length of previously formed tubing (with one or more seams) that is held stationary while the forming mould is moved relative thereto. It will also be obvious the process lends itself to using many parallel strands of wire or parallel pieces of strip material. This process also permits using parallel pieces of selectively differing thicknesses accommodated by a mould such that the wall thickness of the seamless tube could be varied if so and as may be desired.

I claim:

1. A process for the continuous manufacture of seamless tube comprising confining a selected length of metal strip in the form of a tube and with at least two longitudinal abutting edges in a mould, completely melting a selected length of said confined tubular form to form a seamless tube, cooling the formed seamless tube sufficiently to solidify the material and at the same time melting the material of an adjacent portion which is then cooled and continuing such process until a selected continuous length of seamless tube is formed.

2. The process of claim 1 wherein said cooling is in a controlled atmosphere of nitrogen.

3. The process of claim 1 wherein said formed seamless tube is cooled to a temperature of about 700° F. and then subjected to cold working to form a seamless tube of selected diameter and selected wall thickness.

4. A process for forming seamless tubing comprising confining a selected length of strip material having tubular form, with at least one longitudinal seam, between an open ended outer sleeve and an inner mandrel which together define a forming mould; heating a portion of said selected length to a selected temperature; further heating part of said portion to the melting temperature of the material to form a tube of molten material; causing relative axial movement of said forming mould and said tube and allowing the molten material to solidify into a seamless tube while a continuing adjacent length of the tube is brought to its molten state and continuing the process until a seamless continuous length of tube of selected length is formed.

5. The process of claim 4 wherein the material is metal.

6. The process of claim 5 wherein said metal is in the form of a single strip bent into a tube with only one longitudinal seam.

7. The process of claim 5 wherein said single strip of metal is moved continuously through a mould.

8. The process of claim 7 wherein said metal strip is heated by electric induction heating selectively controlled to cause the tube to preheat to a selected temperature and then be subjected to a temperature bringing the metal to its molten state to form a seamless tube and while the seamless tube is moving it is cooled downstream from the melting zone solidifying the metal and bringing it to a selected temperature before exiting from the mould.

* * * * *